Dec. 17, 1957 J. L. BILLS 2,816,942
PRODUCTION OF ACETYLENE
Filed March 29, 1954
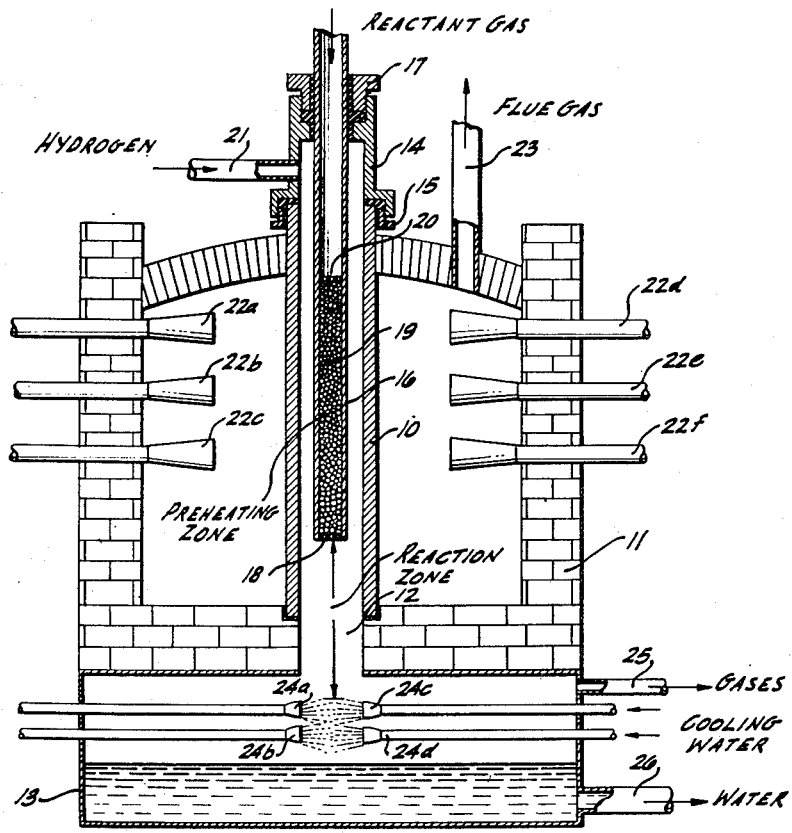
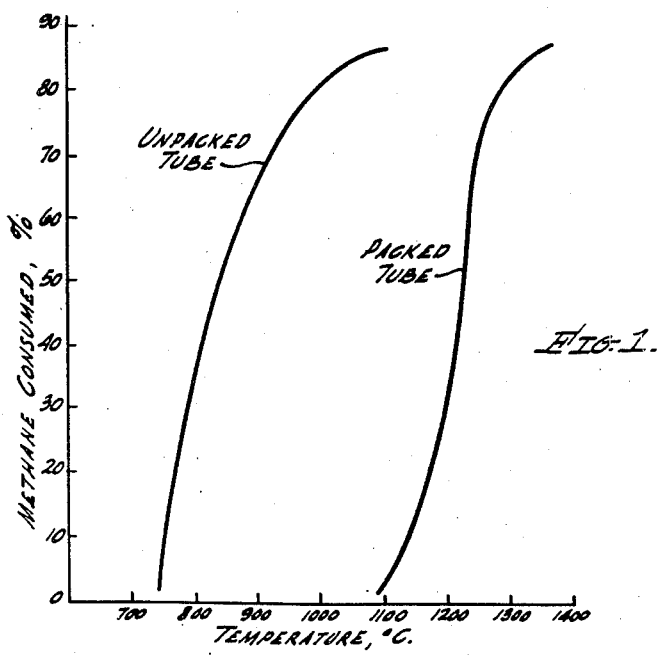
INVENTOR.
JOHN L. BILLS,
BY
Richard C. Hartman
ATTORNEY

United States Patent Office 2,816,942
Patented Dec. 17, 1957

2,816,942

PRODUCTION OF ACETYLENE

John L. Bills, Long Beach, Calif., assignor to Union Oil Company of California, Los Angeles, Calif., a corporation of California Application March 29, 1954, Serial No. 419,511

16 Claims. (Cl. 260—679)

This invention relates to the production of acetylene, and in particular concerns an improved process for obtaining acetylene by the partial oxidation of hydrocarbons.

In my copending application, Ser. No. 240,728, filed August 7, 1951, now Patent No. 2,679,544, there is described a process for the production of acetylene wherein a reactant gas mixture comprising a hydrocarbon, preferably methane or natural gas, and oxygen is preheated to an incipient reaction temperature and is then admixed with hydrogen. The introduction of hydrogen into the preheated reactant gas initiates the acetylene-producing reaction and an accompanying increase in temperature. In a typical operation a mixture of methane or natural gas and air is passed through a preheating zone, wherein it is heated to a temperature of about 1000° C. without reaction between the hydrocarbon and oxygen taking place to any substantial extent, and the preheated reactant gas is then passed through a reaction zone into which a hydrogen-containing gas is introduced. The acetylene-producing reaction which is initiated within the reaction zone upon admixture of the hydrogen-containing gas with the preheated reactant gas is exothermic and results in a temperature of about 1250° C. being attained in the reaction zone without the substantial addition of heat thereto. The residence time of the reacting gases in the reaction zone is maintained at about 0.002–0.02 second, after which they are quench cooled to a temperature at which substantially no further reaction takes place. This type of operation is capable of producing acetylene in yields as high as 45–50 percent of theoretical, based on the hydrocarbon consumed, even when employing air as the source of oxygen.

In carrying out the foregoing process it is desirable that the reactant gas be preheated to as high a temperature as possible without reaction between the components thereof taking place to any substantial extent. Such temperature depends to some extent upon a variety of factors, e. g., the identity of the hydrocarbon reactant, whether the oxygen is provided in the form of air, oxygen-enriched air or pure oxygen, the composition of the reactant gas, the residence time within the preheating zone, etc., but even under relatively ideal conditions is not above about 1100° C. Considerable advantage in the way of higher reaction temperatures, decreased reaction times, and improved yields would lie in increasing the preheat temperature, if only by as little as 25°–50° C., but heretofore all attempts in this direction have resulted in reaction between the components of the reactant gas occurring to an undesirable extent within the preheating zone.

It is accordingly an object of the present invention to provide means whereby mixtures of hydrocarbons and oxygen may be heated to high temperatures without reaction occurring to any substantial extent.

Another object is to provide an improved process for the production of acetylene by the partial oxidation of hydrocarbons.

Other and related objects will be apparent from the following detailed description of the invention, and various advantages not specifically referred to herein will occur to those skilled in the art upon employment of the invention in practice.

I have now found that the above objects and related advantages may be realized by the simple expedient of effecting the heating in the presence of a particulate body of a solid non-catalytic refractory material. More particularly, I have found that the temperature to which mixtures comprising hydrocarbon and oxygen can be heated without substantial reaction occurring can be appreciably increased by effecting the heating in a zone which is packed or filled with particles of a refractory non-catalytic solid. This result is surprising in view of the fact that the packing undoubtedly promotes turbulence in the gas passing through the heating zone, and in most instances turbulent flow of gases promotes reaction therein. Ordinarily, then, it would be expected that employing a packed reaction zone would lower rather than raise the temperature to which the gas could be heated without substantial reaction occurring.

With respect to the above-described acetylene process, the present discovery is applied by providing a suitably packed preheating zone rather than the free-space zone which has heretofore been employed, and results in being able to employ higher preheat temperatures and, consequently, shorter preheating times, higher reaction temperatures, shorter reaction times, greater heat economy, etc., all of which lead to important economic and process advantages. A further advantage arises out of the fact that employing a packed preheating zone as herein described increases the efficiency of heat transfer from whatever source is employed to the reactant gas in the preheating zone, thereby directly resulting in important savings in heat requirements.

The effect of heating hydrocarbon-oxygen mixtures in the presence of non-catalytic particulate solids as opposed to heating in free space is illustrated graphically by the curves of Figure 1 of the accompanying drawing which forms a part of this application. The data from which these curves were plotted were obtained by a series of experiments each of which involved passing a gas mixture consisting of 58.8 percent by volume of methane and 41.2 percent by volume of oxygen through a tube mounted in an electric furnace and maintained at a preselected temperature. The space velocity was of the order of 15,000 cu. ft. of gas per cu. ft. of free space per hour. In each case, the product gas was collected and analyzed for methane, and the methane consumed was calculated in terms of the percent of the total supplied. Two sets of experiments were performed: in the first, the tube was unpacked whereas in the second the tube was filled with unglazed porcelain beads. It will be noted from the curves that when the packed heating tube was employed the temperature of the gas mixture could be raised to about 1140° C. before the methane was consumed to an extent of about 10 percent, whereas with the unpacked tube consumption of methane to the extent of about 10 percent occurred at a temperature of only about 760° C. It will be understood, of course, that these temperature values are valid only for the particular gas mixture and operating conditions employed, but the same essential difference exists with other hydrocarbon-oxygen mixtures under different operating conditions.

According to a preferred embodiment of the invention, acetylene is produced by passing a reactant gas mixture through a packed preheating zone, wherein it is heated to an incipient reaction temperature in the presence of a particulate solid as herein disclosed and without reaction occurring to any substantial extent, and thence through a reaction zone into which hydrogen is introduced to initiate an exothermic acetylene-producing reaction. With the exception of the preheating step, such process follows closely the course of that set forth in the aforementioned U. S. Patent No. 2,679,544. Thus, the hydrocarbon component of the reactant gas may be any non-aromatic hydrocarbon having a normal boiling point below about 400° C. under atmospheric pressure, and the oxygen reactant may be relatively pure oxygen, oxygen-enriched air or ordinary air. Economic considerations, however, dictate an almost exclusive preference for methane or natural gas and air. The mole ratio of oxygen to hydrocarbon varies between rather wide limits depending upon the identity of the hydrocarbon reactant; for example, such ratio will be as high as 50/1 when the hydrocarbon is one of relatively high molecular weight, e. g., kerosene, and only between about 0.33/1 and about 0.75/1 when the hydrocarbon is methane or natural gas. When the reactant gas consists of a mixture of methane or natural gas and air it will suitably comprise between about 17 and about 30 percent by volume of methane or natural gas and, conversely, between about 83 and about 70 percent by volume of air.

The hydrogen which is introduced into the reaction zone along with the preheated reactant gas may be substantially pure molecular hydrogen or a mixture of hydrogen and an inert gas which does not react with the other components of the system under the conditions existing in the reaction zone, e. g., nitrogen, carbon monoxide, carbon dioxide, water vapor, etc. Such mixed hydrogen-containing gas may comprise as high as 70 percent by volume of inert components, although it is usually preferable that it contain at least about 85 percent by volume of hydrogen and less than about 15 percent by volume of inert components, and will usually comprise at least a portion of the product gas which remains after separation of the acetylene product therefrom. The hydrogen-containing gas is usually introduced into the reaction zone in an amount sufficient to provide between about 0.5 and about 5 moles of hydrogen per mole of hydrocarbon in the reactant gas, and is preferably preheated to substantially the same temperature as the reactant gas.

The temperature to which the reactant gas is preheated prior to its introduction into the reaction zone is such that the temperature attained in the reaction which is induced by introduction of the hydrogen into the reaction zone is between about 1250° C. and about 1500° C. It is a unique characteristic of the process that if the reactant gas is sufficiently preheated in the absence of hydrogen without reaction, upon being admixed with hydrogen an exothermic acetylene-producing reaction takes place spontaneously and without the addition of any further substantial quantity of heat. As a result of such exothermic reaction occurring the temperature of the reacting gas increases very rapidly to a value considerably higher than the preheat temperature. In the past, preheating of the reactant gas has been carried out by passing the gas through an unpacked tubular preheating zone to which heat was supplied externally. Except under more or less ideal conditions, however, it has been found that with such type of preheating it is difficult to attain sufficiently high preheat temperatures without the components of the reactant gas reacting to an undesirable extent. Thus, under commercially practical conditions the reactant gas cannot usually be preheated substantially above about 1000° C. without the components thereof undergoing reaction to an undesirable extent, and with such preheat temperature it is barely possible to attain the optimum high temperature during the course of the reaction. In accordance with the present invention, i. e., by employing a packed preheating zone, it is possible to preheat the reactant gas to considerably higher temperatures without substantial reaction, thereby producing desirably higher temperatures in the reaction zone.

As previously stated, the advantages of the present invention are attained through the use of a packed preheating zone. The packing material is a particulate refractory solid which is chemically and physically inert with respect to the reactant gas and which does not effect any substantial change in the composition thereof under the conditions prevailing in the preheating zone. Materials having catalytic, absorptive or adsorptive properties under such conditions are thus precluded. The preferred material is unglazed porcelain in the form of spherical particles, beads or pellets. The size of the particles is chosen so as to provide a large surface area without unduly increasing the pressure drop through the preheating zone. Suitably, such pressure drop should not be more than, say, 1–5 inches of water. The optimum particle size will thus depend upon a variety of factors, including the design of the equipment, the preheat temperature, the composition of the reactant gas, the space velocity, etc., but is usually about 0.125–1.0 inch in the maximum dimension. One-half inch unglazed porcelain spheres have been found ideal for medium-sized reactors. Usually, the packed preheating zone contains between about 10 and about 50 percent of its total volume as free space existing between the particles of the packing material. Other materials which may be employed include stainless steel, graphite, carborundum, etc. Quartz and alumina are unsatisfactory by reason of their catalytic activity.

The preheat time, i. e., the residence time of the reactant gas within the preheating zone, is between about 0.005 and about 0.5 second, with the shorter values within this range being preferred. The preheat time is usually expressed more conveniently in terms of space velocity which should be at least about 5000 cu. ft. of reactant gas per cu. ft. of free space in the preheating zone per hour, and is preferably between about 10,000 and about 40,000 cu. ft./cu. ft./hour. One of the corollary advantags in employing a packed preheating zone lies in the improved heat transfer from the exterior source of heat to the gas passing through the zone; consequently, a given preheat temperature can be attained in a shorter period of time. The reactant gas components are preferably admixed prior to preheating, and the hydrogen-containing gas is usually also preheated, preferably to substantially the same temperature as the reactant gas, prior to its introduction into the reaction zone.

As stated, the temperature prevailing in the reaction zone should be between about 1250° C. and about 1500° C. The reaction time, i. e., the time interval between introduction of the preheated reactant gas into the reaction zone and the cooling of the product gas to a temperature at which substantially no further reaction occurs, varies inversely with the reaction temperature. Shorter reaction times are thus employed at the higher reaction temperatures within the given range, and vice versa. Such time is between about 0.001 and about 0.05 second, preferably between about 0.002 and about 0.01 second, and is readily controlled by varying the rate at which the gases are introduced into and withdrawn from the reaction zone. The temperature to which the product gas is cooled within such period of time after introduction of the preheated reactant gas into the reaction zone is usually below about 600° C.

Figure 2 of the accompanying drawing illustrates a reactor suitable for carrying out the above-described process. Said reactor consists of a refractory tube 10 vertically disposed within furnace 11, which is constructed of firebrick or other refractory material. The lower end of tube 10 corresponds with an opening 12 in the floor of furnace 11, and thus communicates with quenching chamber 13 located directly below furnace 11. The upper end of tube 10 passes through the roof of furnace 11 and terminates outside the furnace in fitting 14. Packing gland 15 serves to form a gas-tight connection between tube 10 and fitting 14. Fitting 14 supports gas inlet tube 16 within tube 10, with packing gland 17 serving to form a gas tight connection between reactant gas inlet 16 and fitting 14. Reactant gas inlet 16 extends within tube 10 for a portion of its length, and communicates with an exterior supply of the reactant gas, not shown. The lower end of tube 16 is closed by a perforate refractory disc 18 which serves to retain within tube 16 a body of particulate refractory solids 19. Upper perforate disc 20 also serves to retain the particulate solids within reactant gas inlet 16. Fitting 14 also supports hydrogen inlet 21 which communicates between an exterior supply of hydrogen, not shown, and the annular space between tube 10 and reactant gas inlet 16. Burners 22a to 22f are positioned within furnace 11 so as to heat that part of tube 10 within which reactant gas inlet 16 extends, and are supplied with a combustible gas or liquid fuel from an exterior source, not shown. Stack 23 in the roof of furnace 11 provides an exit for the flue gas generated by the burners. Within quenching chamber 13 located beneath furnace 11 water sprays 24a to 24d are positioned so as to direct sprays of water into the gas stream issuing from opening 12 in the furnace floor. A gas outlet 25 is provided in the upper part of quenching chamber 13 for withdrawing the cooled product gas, and outlet 26 located near the bottom of the chamber serves for the withdrawal of water therefrom. Within the reactor, that part of reactant gas inlet 16 which extends within the furnace and which contains particulate solid bed 19 forms a packed preheating zone wherein the reactant gas is preheated to the desired temperature by burners 22a to 22f. The hydrogen which is introduced through hydrogen inlet 21 is likewise preheated as it passes through the annular space between tube 10 and reactant gas inlet 16. As indicated, the reaction zone extends from the lower end of reactant gas inlet 16 within tube 10 where the reactant gas and hydrogen come in contact with one another to the point within quenching chamber 13 where the hot product gas is cooled by water sprays 24a to 24d.

Operation of this reactor is as follows: The reactant gas, comprising a suitably proportioned mixture of hydrocarbon and oxygen or air, and a hydrogen-containing gas are introduced through their respective inlets and are preheated as they pass through tubes 10 and 16 opposite burners 22a to 22f. Preheating of the reactant gas takes place in the presence of the fixed bed of particulate solids 19. At the end of tube 16 within tube 10 the preheated gases become admixed and reaction occurs to produce acetylene as the mixture passes through the reaction zone. Upon completion of the reaction the product gas is shock-cooled by water sprays 24a to 24d, and the cooled gas is withdrawn through outlet 25 and is passed to storage. Separation and recovery of the acetylene from the cooled product gas may be accomplished by selective solvent extraction, selective adsorption on adsorptive solids or by any other means known in the art. A typical set of operating conditions is as follows:

Reactant gas:
  Methane_____ 24.6% by vol.
  Air_____ 73.4% by vol.
Hydrogen-containing gas:
  Hydrogen_____ 95% by vol.
  Nitrogen_____ 5% by vol.
Rate of feed, reactant gas_____ 62.6 s. c. f./hr.
Rate of feed, hydrogen-containing
  gas_____ 24.5 s. c. f./hr.
Preheat temperature, reactant gas__ 1120° C.
Residence time in preheat zone___ 0.008 sec.
Space velocity in preheat zone___ 16,000 cu. ft./cu. ft. per hour.
Reaction temperature_____ 1320° C.
Residence time in reaction zone___ 0.008 sec.

When operating under these conditions employing the above-described procedure and apparatus the yield of acetylene is about 51.5% based on methane consumption.

As will be apparent to those skilled in the art, many variations with respect to the different operating variables, reactor design, etc. are possible within the herein defined scope of the invention, and various engineering techniques may be applied to the practice of the invention on a large scale. Thus, for example, part of the preheating of the reactant gas and/or hydrogen-containing gas may be effected in indirect heat exchange against the hot product gas. Similarly, various forms of heaters and different types of fuel may be employed for preheating, and the reactor may take various forms adapted to conserve heat as much as possible. Various refractory materials may be employed in the construction of the reactor. Also, while the principle of the invention has been herein described as it applies to the particular process for producing acetylene wherein a hydrogen-containing gas is employed to initiate the acetylene-producing reaction, it will be apparent that the expedient of heating mixtures comprising hydrocarbon and oxygen in the presence of a fixed bed of a particulate non-catalytic refractory solid may be employed in any process wherein it is desired to heat such mixtures to temperatures as high as possible without substantial reaction taking place between the components thereof.

Other modes of applying the principal of my invention may be employed instead of those explained, change being made as regards the materials or methods employed, provided the step or steps stated by any of the following claims, or the equivalent of such stated step or steps, be employed.

I, therefore, particularly point out and distinctly claim as my invention:

1. In a process wherein a gaseous reactant mixture consisting essentially of oxygen and a hydrocarbon selected from the class consisting of methane and natural gas is passed through a preheating zone to which heat is supplied from a source exterior of said zone for the purpose of heating said gas to an incipient reaction temperature without reaction between the components of said mixture taking place to any substantial extent, the improvement which consists in packing said preheating zone with a particulate non-catalytic refractory solid and passing said gas therethrough at a space velocity of at least about 5000 volumes per volume of free space in said packed zone per hour.

2. The process of claim 1 wherein said gaseous reactant mixture consists essentially of air and a hydrocarbon selected from the class consisting of methane and natural gas.

3. The process of claim 1 wherein said gaseous reactant mixture comprises between about 70 and about 83 percent by volume of air and between about 30 and about 17 percent by volume of a hydrocarbon selected from the class consisting of methane and natural gas.

4. The process for producing acetylene which comprises (1) forming a reactant gas mixture consisting essentially of oxygen and a non-aromatic hydrocarbon having a normal boiling point below about 400° C.; (2) passing said reactant gas through an elongated preheating zone which is packed with a particulate non-catalytic refractory solid at a space velocity of at least about 5000 volumes per volume of free space in said packed preheating zone per hour, whereby said gas mixture is preheated to a temperature below that at which reaction between the components thereof takes place to any substantial extent; (3) initiating an acetylene-producing reaction by introducing into the preheated reactant gas a hydrogen-containing gas comprising from about 30 to 100 percent by volume of hydrogen and from about 70 to about zero percent by volume of a diluent gas which is inert under the conditions of said reaction; (4) controlling the temperature of said preheated reactant gas and said hydrogen-containing gas so that the temperature attained in said acetylene-producing reaction is between about 1250° C. and about 1500° C.; and (5) within from about 0.001 to about 0.05 second after introduction of the said hydrogen-containing gas into said preheated reactant gas, cooling the product gas to a temperature at which substantially no further reaction occurs.

5. The process of claim 4 wherein the hydrocarbon reactant is selected from the class consisting of methane and natural gas.

6. The process of claim 4 wherein the reactant gas comprises between about 70 and about 83 percent by volume of air and between about 30 and about 17 percent by volume of a hydrocarbon selected from the class consisting of methane and natural gas.

7. The process of claim 4 wherein the reactant gas is passed through the preheating zone at a space velocity between about 10,000 and about 40,000 volumes per volume of free space in said packed preheating zone per hour.

8. The process of claim 4 wherein the hydrogen-containing gas is employed in an amount sufficient to provide between about 0.5 and about 5 moles of hydrogen per mole of hydrocarbon reactant.

9. The process of claim 4 wherein the preheat temperature is above about 1000° C.

10. The process of claim 4 wherein said particulate solid is composed of unglazed porcelain.

11. The process for producing acetylene which comprises (1) forming a reactant gas mixture essentially comprising oxygen and a hydrocarbon selected from the class consisting of methane and natural gas; (2) passing said reactant gas through a first preheating zone wherein it is heated to a temperature below that at which reaction between the components thereof takes place to any substantial extent, said preheating zone being packed with a particulate non-catalytic refractory solid and said reactant gas being passed therethrough at a space velocity of at least about 5000 volumes per volume of free space in said packed preheating zone per hour; (3) passing a hydrogen-containing gas comprising between about 30 to about 100 percent by volume of hydrogen and between about 70 and zero percent by volume of a diluent gas which is inert under the conditions of the subsequent acetylene-producing reaction through a second preheating zone wherein said hydrogen-containing gas is preheated to a temperature substantially the same as that of the preheated reactant gas; (4) initiating an acetylene-producing reaction by simultaneously introducing the preheated hydrogen-containing gas and the preheated reactant gas into a reaction zone; (5) controlling the preheat temperature so that the temperature attained in said acetylene-producing reaction is between about 1250° C. and about 1500° C.; and (6) within from about 0.001 and about 0.05 second after introduction of said gases into said reaction zone, withdrawing an acetylene-containing product gas from said reaction zone and cooling it to a temperature at which substantially no further reaction occurs.

12. The process of claim 11 wherein the reactant gas comprises between about 70 and about 83 percent by volume of air and between about 30 and about 17 percent by volume of a hydrocarbon selected from the class consisting of methane and natural gas.

13. The process of claim 11 wherein the reactant gas is passed through the packed first preheating zone at a space velocity between about 10,000 and about 40,000 volumes per volume of free space in said packed preheating zone per hour.

14. The process of claim 11 wherein the hydrogen-containing gas is employed in an amount sufficient to provide between about 0.5 and about 5 moles of hydrogen per mole of hydrocarbon reactant.

15. The process of claim 11 wherein said particulate non-catalytic refractory solid is unglazed porcelain and occupies between about 50 and about 90 percent of the total space within the preheating zone.

16. The process of claim 11 wherein the reactant gas is preheated to a temperature above about 1000° C. prior to its introduction into the reaction zone.

References Cited in the file of this patent

UNITED STATES PATENTS

| | | |
|---|---|---|
| 1,917,627 | Wulff | July 11, 1933 |
| 2,476,729 | Helmers | July 19, 1949 |
| 2,543,005 | Evans | Feb. 27, 1951 |
| 2,543,742 | Evans | Feb. 27, 1951 |
| 2,556,196 | Krejci | June 12, 1951 |
| 2,679,541 | Berg | May 25, 1954 |
| 2,679,544 | Bills | May 25, 1954 |